US010994997B2

(12) United States Patent
Lin et al.

(10) Patent No.: US 10,994,997 B2
(45) Date of Patent: May 4, 2021

(54) DEVICE AND METHOD FOR INDUSTRIALIZED CONTINUOUS PRODUCTION OF BLACK PHOSPHORUS

(71) Applicant: Black P2 (USA) INC., Bakersfield, CA (US)

(72) Inventors: Ming Lin, Bakersfield, CA (US); Hejun Wang, Bakersfield, CA (US); Xinyue Lin, Bakersfield, CA (US); Xinyang Lin, Bakersfield, CA (US); Yifei Wang, Bakersfield, CA (US); Sam Zhang, Bakersfield, CA (US); Ruoyu Xu, Monterey Park, CA (US); Jizhou Yang, Monterey Park, CA (US); Yixiang Wang, Bakersfield, CA (US)

( * ) Notice: Subject to any disclaimer, the term of this patent is extended or adjusted under 35 U.S.C. 154(b) by 35 days.

(21) Appl. No.: 16/392,593

(22) Filed: Apr. 23, 2019

(65) Prior Publication Data

US 2019/0382267 A1 Dec. 19, 2019

(51) Int. Cl.
*C01B 25/02* (2006.01)
*B01J 6/00* (2006.01)
*C01B 25/00* (2006.01)

(52) U.S. Cl.
CPC ............... *C01B 25/02* (2013.01); *B01J 6/004* (2013.01); *C01B 25/003* (2013.01); *C01P 2002/72* (2013.01); *C01P 2006/40* (2013.01)

(58) Field of Classification Search
CPC ........ C01B 25/02; C01B 25/003; B01J 6/004; B01J 6/001; C01P 2002/72; C01P 2006/40
See application file for complete search history.

(56) References Cited

U.S. PATENT DOCUMENTS

| | | | | |
|---|---|---|---|---|
| 4,508,931 A | * | 4/1985 | Michel | C01B 25/003 136/255 |
| 4,818,636 A | * | 4/1989 | Michel | C01B 25/003 257/E29.1 |
| 5,032,472 A | * | 7/1991 | Michel | C03C 17/22 428/704 |

FOREIGN PATENT DOCUMENTS

CN          109650359 A  *  4/2019

* cited by examiner

*Primary Examiner* — Anthony J Zimmer
(74) *Attorney, Agent, or Firm* — Novoclaims Patent Services LLC; Mei Lin Wong

(57) ABSTRACT

A device for producing black phosphorus which includes a reactor having one end connected to a feeding pipe and another end connected to a discharge pipe; a propeller blade unit including a rotating shaft mounted between the two ends of the reactor and a blade element mounted on the rotating shaft; a motor connected to the rotating shaft for controlling a rotation speed of the blade element; a heating device enclosing the reactor at an outer side and defines the reactor into a plurality of heating zones; and an inert gas input connected to the discharge pipe. The device is simple and safe in operation, can optimize the production process at low cost, and has high level of automation, thus facilitating a continuous production of black phosphorus under normal pressure.

6 Claims, 8 Drawing Sheets

DEVICE AND METHOD FOR INDUSTRIALIZED CONTINUOUS PRODUCTION OF BLACK PHOSPHORUS

BACKGROUND OF THE PRESENT INVENTION

Field of Invention

The present invention relates to black phosphorus preparation, and more particularly to a device and method for industrialized continuous production of black phosphorus.

Description of Related Arts

Black phosphorus is a black metallic luster crystal, which has the weakest reactivity in the allotrope of phosphorus and does not ignite in the air. Therefore, black phosphorus is very difficult to produce. In general, black phosphorus is produced by heating white phosphorus under high pressure condition. Black phosphorus is very similar to graphite in appearance, performance and structure. It is black in color, has a sheet-like appearance, is electrically conductive, and forms a pleated sheet from the linked atoms. The phonons, photons and electrons in the layered black phosphorus structure exhibit high anisotropy and therefore the black phosphorus has a significant potential application value in electronic thin films and infrared optoelectronics technologies.

Black phosphorus is very difficult to prepare. At first, the high temperature and high pressure conditions are very harsh, so it is difficult to industrialize production at large-scale. At present, black phosphorus is mainly produced by converting red phosphorus to black phosphorus by high pressure method or high energy ball milling method. However, the temperature and pressure are not easy to control, the energy consumption is high, the success rate of synthetic black phosphorus is low, and the prepared black phosphorus is easily oxidized. Also, this method can only prepare black phosphorus intermittently, making it difficult to develop and commercialize applications on a large scale basis.

SUMMARY OF THE PRESENT INVENTION

An object of the present invention is to provide a device for producing black phosphorus for industrialized continuous production under normal pressure condition, which has the advantages of optimized production process, low production cost, simple and safe in operation, and high level of automation.

An object of the present invention is to provide a method for producing black phosphorus which is suitable for use in industrialized continuous production under normal pressure condition, which has the advantages of optimized production process, low production cost, simple and safe in operation, and high level of automation.

According to the present invention, the foregoing and other objects and advantages are attained by a device for producing black phosphorus for industrialized continuous production, comprising:

a heat-resistant spiral conversion reactor; a feeding pipe; a discharge pipe; a propeller blade; a motor; and a heating device and an inert gas input, wherein the heat-resistant spiral conversion reactor comprises a housing and a reaction chamber therein, the housing is elongated in structure defining two opposite ends, namely a first end and a second end, the feeding pipe is connected to the first end of the housing so that raw materials is capable being fed into the reaction chamber at the first end through the feeding pipe, the discharge pipe is connected to the second end of the housing at a bottom portion thereof, the propeller blade unit comprises a rotating shaft, a blade element mounted on the rotating shaft and two bushing elements connecting two ends of the rotating shaft to the first end and the second end of the housing, the motor is connected to the rotating shaft at one end of the rotating shaft for driving a rotational movement of the rotating shaft so that the blade element is driven to rotate, the heating device encloses the housing at an outer side and defines the heat-resistant spiral conversion reactor into a plurality of heating zones from the first end to the second end, the inert gas input pipe is connected to the discharge pipe.

Preferably, the housing comprises an outer casing and an inner liner detachably connected to an inner side the outer casing.

Preferably, the heating device comprises a plurality segments of resistance wire and a heating control electrically connected to the plurality segments of resistance wire.

Preferably and alternatively, the heating device employs high temperature gas for heating and comprises a gas inlet and a gas outlet, wherein the gas inlet is positioned in a middle portion of the heating device and the gas outlet is positioned at the two ends of the heat-resistant spiral conversion reactor and a bottom end of the feeding pipe.

Preferably, a raw materials conveying pipe and/or a fluid materials input is/are connected to the feeding pipe, and a feeding port is provided on the raw materials conveying pipe.

Preferably, a product conveying pipe is provided at a bottom portion of the discharge pipe.

Preferably, a product discharge port is provided on the product conveying pipe; and a product packaging system is connected to the product conveying pipe through the product discharge port.

Preferably, the raw materials conveying pipe or the product conveying pipe employs a spiral conveying movement mechanism for conveyance. The spiral conveying movement mechanism makes the feeding materials and discharge materials more uniformly mixed, which makes it easier to control the amount of input/output materials, and the level of automation is much higher.

Preferably, the outer casing is made of stainless steel, carbon steel, manganese or metal with carbide coating; and the inner liner is made of graphite, high temperature resistant glass or enamel. The use of graphite for the inner lining provides better conduction performance, better heating and insulating effect, and more uniformity effect, therefore the produced black phosphorus has higher quality.

A method of producing black phosphorus for industrialized continuous production, comprising the steps of:

(I) Preparing raw materials: the reaction raw materials are red phosphorus, tin and iodine, and the reaction raw materials are weighed according to the ratio of red phosphorus: tin:iodine=6~40:0.7~3:0.2~0.7;

(II) Filling the raw materials: the raw materials are mixed uniformly and transported to a feeding pipe through a raw materials conveying pipe;

(III) Carrying out calcination reaction: introducing inert gas to a heat-resistant spiral conversion reactor through an inert gas input pipe to remove the air therein; dividing the heat-resistant spiral conversion reactor into four zones, namely, A: a first zone of medium temperature, B: a high temperature zone, C: a second zone of medium temperature, and D: a low temperature zone, preheating by a heating device, and controlling a temperature of the four zones in order of 400-550° C., 550-700° C., 300-500° C., 230-350° C.; heating the raw material in the feeding pipe and then feeding into the heat-resistant spiral conversion reactor such that the raw materials are guided to move through the four zones in sequence towards a discharge pipe under driving force of a propeller blade and to carry out reaction in the four zones, wherein a residence time of the raw material is controlled to 2-20 h by a motor, through which a rotation speed of a propeller blade is controlled; and a final product is prepared after the reaction in the four zones is completed, then the final product is discharged through the discharge pipe and is transported to a product packaging system through a product conveying pipe for packaging into an end product.

A method of producing black phosphorus for industrialized continuous production, comprising the steps of:

(I) Preparing raw materials: the reaction raw materials are yellow phosphorus, tin and iodine, and the reaction raw materials are weighed according to the ratio of yellow phosphorus:tin:iodine=6~40:0.7~3:0.2~0.7;

(II) Filling the raw materials: the raw materials tin and iodine are mixed uniformly and transported to the feeding pipe through the raw materials conveying pipe while yellow phosphorus is added to the reactor by the fluid material input pipe;

(III) Carrying out calcination reaction: introducing inert gas to a heat-resistant spiral conversion reactor through an inert gas input pipe to remove the air therein; dividing the heat-resistant spiral conversion reactor into four zones, namely, A: a first zone of medium temperature, B: a high temperature zone, C: a second zone of medium temperature, and D: a low temperature zone, preheating by a heating device, and controlling a temperature of the four zones in order of 400-550° C., 500-700° C., 300-500° C., 230-350° C.; heating the raw materials yellow phosphorus, tin and iodine in the feeding pipe and then feeding the raw materials into the heat-resistant spiral conversion reactor such that the raw materials are guided to move through the four zones in sequence towards a discharge pipe under driving force of a propeller blade and to carry out reaction in the four zones, wherein a residence time of the raw material is controlled to 2-20 hours by a motor, through which a rotation speed of a propeller blade is controlled; and a final product is prepared after the reaction in the four zones is completed, then the final product is discharged through the discharge pipe and is transported to a product packaging system through a product conveying pipe for packaging into an end product.

Preferably, a ratio of red phosphorus/yellow phosphorus: tin:iodine=16~24:0.9~1.4:0.3~0.6; the residence time of the raw materials in the four zones are controlled to 1-4 hours, 3-15 hours, 1-3 hours and 1-3 hours respectively.

The working principle of the present invention: after the raw materials (such as red phosphorus/yellow phosphorus, tin, iodine) enter the feeding pipe, they are in the medium temperature zone A of the reaction system with a temperature of 400-550° C. In this zone, the iodine is sublimated and the tin changes to liquid state, and the gaseous iodine and the liquid tin react to form a tin iodide catalyst; the tin iodide and red phosphorus (or liquid yellow phosphorus) absorb heat energy and undergo gasification to form a gas mixture. The gas mixture enters into the heat-resistant spiral conversion reactor and enters into the high temperature zone B of the reaction system with a temperature of 500-700° C. In this zone, the molecular structure of the phosphorus vapor is further changed under the action of tin iodide. The material in the high temperature zone B proceeds to the second medium temperature zone C with a temperature of 300-500° C. In this zone, the phosphorus vapor whose molecular structure is changed under the action of the tin iodide catalyst is converted to form a black phosphorus solid; the black phosphorus solid enters the subsequent low temperature zone D with a temperature of 230-350° C. under the action of the propeller blade unit, and the black phosphorus is shaped in this zone to obtain the final product.

The present invention has the following advantageous technical effects:

1. Compared with the existing black phosphorus production methods such as high pressure method and high energy ball milling method, the present invention overcomes the problems of low production efficiency and high cost in the conventional intermittent production, and is capable of realizing large-scale production of black phosphorus in large quantities, thus is advantageous for increasing output, reducing costs and improving production efficiency for further promoting the development of black phosphorus industry.

2. The device and method of the present invention have no specific limitation on the pressure requirement during production. The black phosphorus can be produced under normal pressure conditions. The pressure difference between the pressure inside the reactor and the atmospheric pressure is small, so the pressure control system is not needed and the operation of the entire production system is more convenient. The equipment is not easy to wear and has a longer service life, thereby further reducing the cost of production.

3. The device and method of the present invention can effectively reduce the usage of auxiliary materials such as tin and iodine in the continuous production process because the tin iodide formed by the tin and iodine added in the early stage is mostly present in a liquid form in the bottom portion of the heat-resistant spiral conversion reactor, which can effectively reduce the consumption of auxiliary raw materials. Therefore, the auxiliary materials iodine and tin can be replenished at a quantity of reducing by halve and by three-quarters respectively in a continuous production every 5-10 days, thus further reducing the cost of production.

4. The device of the present invention provides a heating device with a plurality of heating segments for providing heating at different segments, therefore the reactor can be divided into a plurality of different temperature zones and hence the reaction temperature and time of the device can be flexibly set.

5. The final product of the present invention can be continuously packaged in the system to avoid excessive contact with air, thus ensuring the purity of the black phosphorus crystal product and preventing oxidation. Accordingly, the final product has high quality and is stable.

6. Conventional black phosphorus production methods often use quartz tubes create a vacuum environment to ensure oxygen-free or low-oxygen conditions in the production process. The present invention provides an oxygen-free or oxygen-free environment in the entire device by introducing a small amount of inert gas into the reaction chamber, which then meets the production conditions of black phosphorus. The process is more optimized, and the operation is more convenient.

7. The device and method of the present invention can realize the dual production of the solid raw material and the liquid raw material, and the feeding port of the solid raw material and the feeding port of the liquid raw material are arranged on the device. Based on the different requirements, different production modes can be used, and the device can be more conveniently managed.

Still further objects and advantages will become apparent from a consideration of the ensuing description and drawings.

These and other objectives, features, and advantages of the present invention will become apparent from the following detailed description, the accompanying drawings, and the appended claims.

Figure 1:
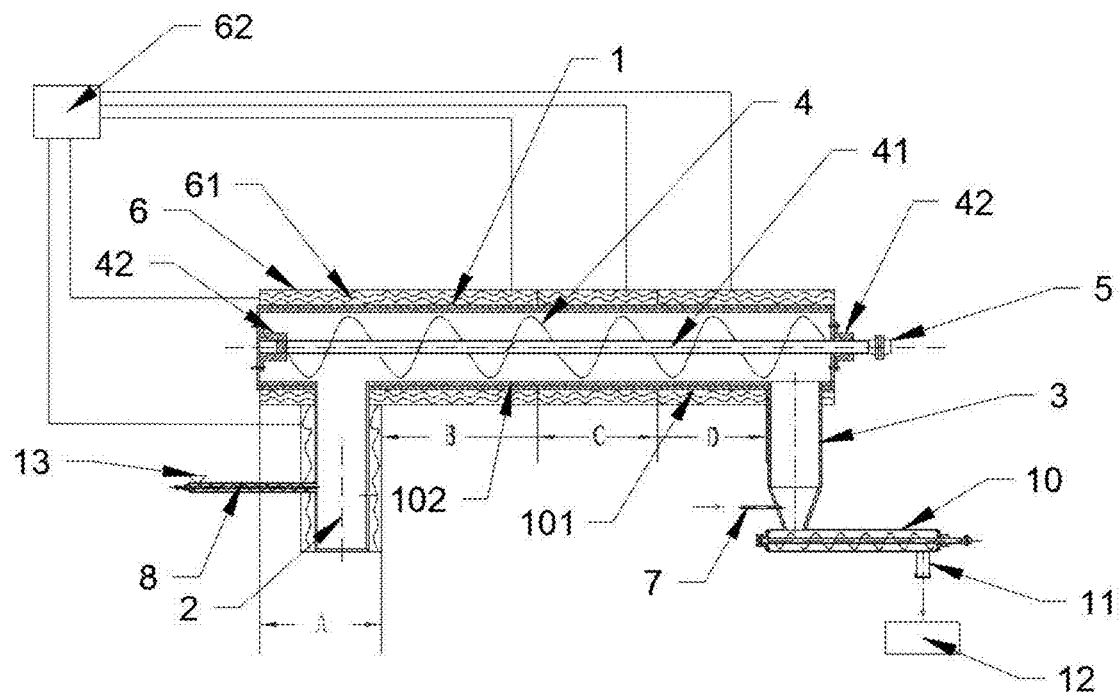
FIG. 1 is a schematic illustration of a device for producing black phosphorus for industrialized continuous production of which resistance wires are employed for heating according to a preferred embodiment of the present invention.

Numerical references: 1: heat-resistant spiral conversion reactor, 100: housing, 101: outer casing, 102: inner liner, 103: reaction chamber, 104: first end, 105: second end, 2: feeding pipe, 3: discharge pipe, 4: propeller blade unit, 40: blade element, 41: rotating shaft, 42: bushing, 5: motor, 6: heating device, 61: resistance wire, 62: heating control, 63: gas inlet, 64: gas outlet, 7: inert gas input, 8: raw materials conveying pipe, 9: fluid materials input, 10: product conveying pipe, 11: product discharging port, 12: product packaging system, 13: feeding port, A: first medium temperature zone, B: high temperature zone, C: second medium temperature zone, D: low temperature zone.

DETAILED DESCRIPTION OF THE PREFERRED EMBODIMENT

Referring to FIGS. 1 to 4 of the drawings, a device for producing black phosphorus for industrialized continuous production according to a preferred embodiment of the present invention comprises: a heat-resistant spiral conversion reactor 1; a feeding pipe 2; a discharge pipe 3; a propeller blade unit 4; a motor 5; a heating device 6; and an inert gas 7.

Embodiment 1

Figure 2:
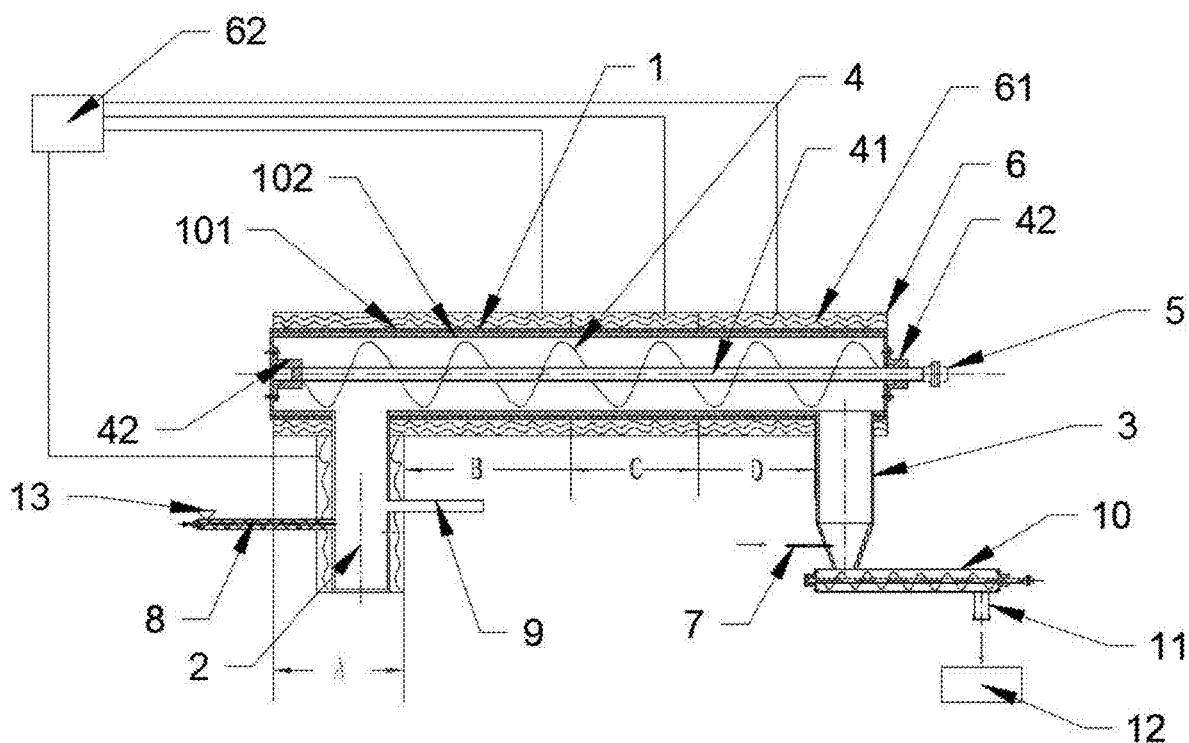
FIG. 2 is another schematic illustration of a device for producing black phosphorus for industrialized continuous production of which resistance wires are employed for heating and fluid materials input is provided according to the above preferred embodiment of the present invention.

Referring to FIG. 1 and FIG. 2 of the drawings, the device for producing black phosphorus for industrialized continuous production according to this preferred embodiment of the present invention comprises: a heat-resistant spiral conversion reactor 1; a feeding pipe 2; a discharge pipe 3; a propeller blade unit 4; a motor 5; a heating device 6 and an inert gas input 7.

The heat-resistant spiral conversion reactor 1 comprises a housing 100 and a reaction chamber 103 therein. The housing 100 is elongated in structure defining two opposite ends, namely a first end 104 and a second end 105. The feeding pipe 2 is connected to the first end 104 of the housing 100 so that raw materials is capable being fed into the reaction chamber 103 at the first end 104 through the feeding pipe 2. The discharge pipe 3 is connected to the second end 105 of the housing 100 at a bottom position. The propeller blade unit 4 comprises a rotating shaft 41, a blade element 40 mounted on the rotating shaft 41 and two bushing elements 42 connecting two ends of the rotating shaft 41 to the first ends 104 and the second ends 105 of the housing 100. The motor 5 is connected to the rotating shaft 41 at one end of the rotating shaft 41 for driving a rotational movement of the rotating shaft 41 so that the blade element 40 is driven to rotate. The heating device 6 encloses the housing 100 at an outer side and defines the heat-resistant spiral conversion reactor 1 into a plurality of heating zones from the first end 104 to the second end 105. The inert gas input pipe 7 is connected to the discharge pipe 3.

Preferably, the housing 100 comprises an outer casing 101 and an inner liner 102 detachably connected to an inner side the outer casing 101. The blade element 40 is extended between the first ends 104 and the second ends 105 of the housing 100 inside the reaction chamber 103.

The heating device 6 comprises a plurality segments of resistance wire 61 and a heating control 62 electrically connected to the plurality segments of resistance wire 61 for controlling a heating temperature of the plurality segments of resistance wire 61.

The device for producing black phosphorus for industrialized continuous production further comprises a raw materials conveying pipe 8 connected to the feeding pipe 2; a feeding port 13 connected to the raw materials conveying pipe 8 arranged for feeding raw materials from the feeding port 13; a product conveying pipe 10 connected to a bottom of the discharge pipe 3; a product discharge port 11 provided on the product conveying pipe 10; and a product packaging system 12 connected to the product conveying pipe 10 through the product discharging port 11.

The raw materials conveying pipe 8 and the product conveying pipe 10 employ spiral conveying movement for conveyance.

The outer casing 101 is made of stainless steel and the inner liner 102 is made of graphite.

According to the present invention, a method of producing black phosphorus by using the device for producing black phosphorus for industrialized continuous production comprises the steps of:

(I) Preparing raw materials: the reaction raw materials are red phosphorus, tin and iodine, and the reaction raw materials are weighed to obtain according to the ratio of red phosphorus:tin:iodine=6:0.7:0.2;

(II) Filling the raw materials: the raw materials are mixed uniformly and transported to the feeding pipe 2 through the raw materials conveying pipe 8;

(III) Carrying out calcination reaction: introducing inert gas to the heat-resistant spiral conversion reactor 1 through the inert gas input pipe 7 to remove air inside the heat-resistant spiral conversion reactor 1; dividing the heat-resistant spiral conversion reactor 1 into four zones, namely, A: a first zone of medium temperature, B: a high temperature zone, C: a second zone of medium temperature, and D: a low temperature zone, preheating the heat-resistant spiral conversion reactor 1 by the heating device 6 such that a temperature of the four zones is controlled sequentially to 400° C., 500° C., 300° C., 230° C. respectively; heating the raw material in the feeding pipe 2 for carrying out reaction and then feeding the raw materials after reaction into the heat-resistant spiral conversion reactor 1 such that the raw materials are guided to move through the four zones in sequence towards the discharge pipe 3 under driving force of the propeller blade unit 4 and to carry out reaction in the four zones, wherein a residence time of the raw material is controlled to 10 hours by the motor 5, through which a rotation speed of the blade element 40 is controlled; and a final product is prepared after the reaction in the four zones is completed, then the final product is discharged through the discharge pipe 3 and is transported to the product packaging system 12 through the product conveying pipe 10 for packaging into an end product.

The heating device 6 divides the reactor 1 into four zones by resistance wire heating, capable of flexibly adjusting the temperature and heating time inside the reactor 1. The final products obtained after the reaction are directly sent to the product packaging system 12 for packaging to avoid oxidation of the final product. In a continuous production, auxiliary materials tin and iodine can be replenished at a quantity of reducing by three-quarters and by halve respectively for every 5 days.

The black phosphorus conversion rate produced by the method in this embodiment is 95%.

Embodiment 2

Figure 3:
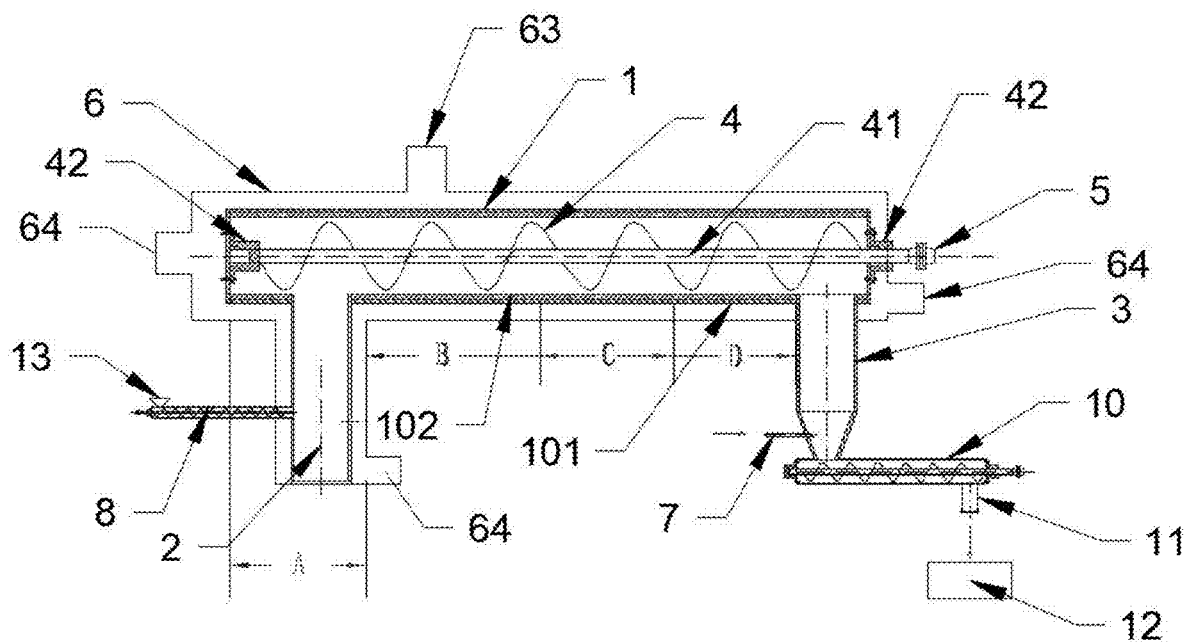
FIG. 3 is a schematic illustration of a device for producing black phosphorus for industrialized continuous production of which high temperature gas is employed for heating according to a preferred embodiment of the present invention.
Figure 4:
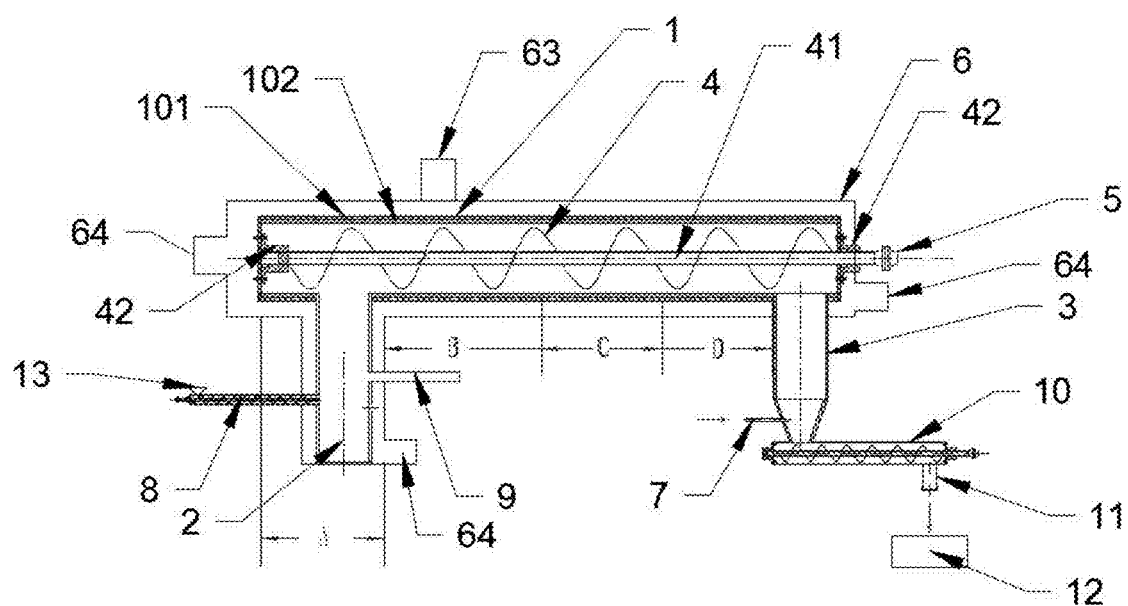
FIG. 4 is another schematic illustration of a device for producing black phosphorus for industrialized continuous production of which high temperature gas is employed for heating and fluid materials input is provided according to the above preferred embodiment of the present invention.
Figure 5:
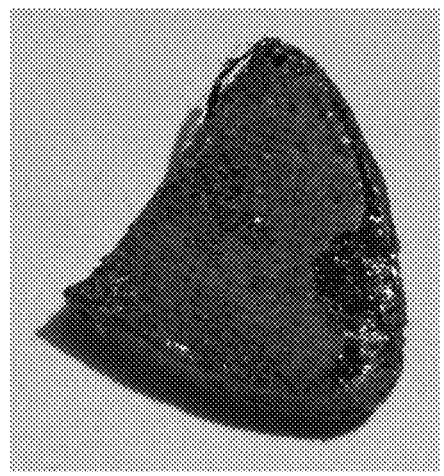
FIG. 5 is a schematic view of the black phosphorus produced by the device and method of the present invention.
Figure 6:
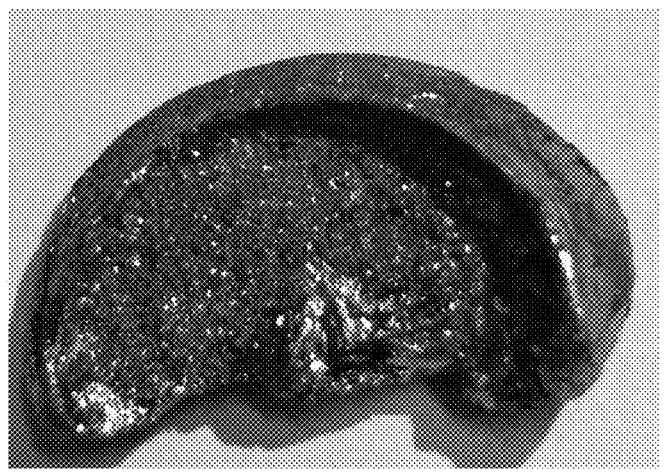
FIG. 6 is a schematic view of the black phosphorus produced by the device and method of the present invention.
Figure 7:
FIG. 7 is a schematic view of the black phosphorus produced by embodiment 3 of the present invention.
Figure 8:
FIG. 8 is a schematic view of the black phosphorus produced by embodiment 4 of the present invention.
Figure 9:
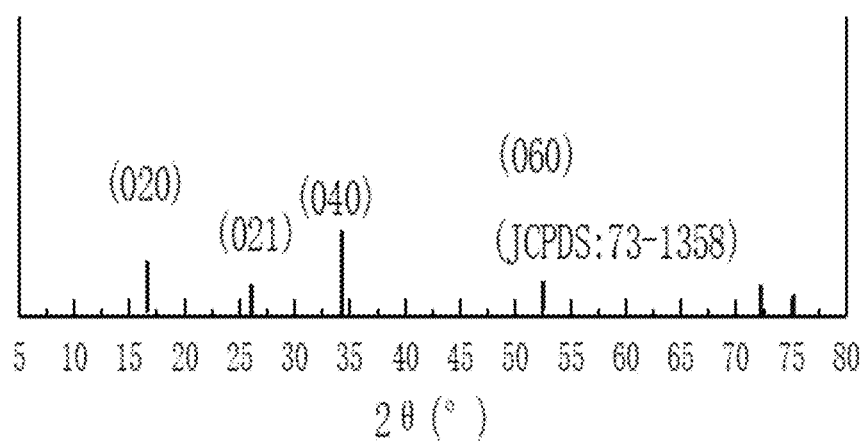
FIG. 9 is a standard XRD spectrum of the black phosphorus.

Referring to FIG. 3 and FIG. 4 of the drawings, the device for producing black phosphorus for industrialized continuous production according to this preferred embodiment of the present invention comprises: a heat-resistant spiral conversion reactor 1; a feeding pipe 2; a discharge pipe 3; a propeller blade unit 4; a motor 5; a heating device 6 and an inert gas input pipe 7.

The heat-resistant spiral conversion reactor 1 comprises a housing 100 and a reaction chamber 103 therein. The housing 100 is elongated in structure defining two opposite ends, namely a first end 104 and a second end 105. The feeding pipe 2 is connected to the first end 104 of the housing 100 so that raw materials is capable being fed into the reaction chamber 103 at the first end 104 through the feeding pipe 2. The discharge pipe 3 is connected to the second end 105 of the housing 100 at a bottom position. The propeller blade unit 4 comprises a rotating shaft 41, a blade element 40 mounted on the rotating shaft 41 and two bushing elements 42 connecting two ends of the rotating shaft 41 to the first ends 104 and the second ends 105 of the housing 100. The motor 5 is connected to the rotating shaft 41 at one end of the rotating shaft 41 for driving a rotational movement of the rotating shaft 41 so that the blade element 40 is driven to rotate. The heating device 6 encloses the housing 100 of the heat-resistant spiral conversion reactor 1 and the feeding pipe 2 at an outer side, and defines the heat-resistant spiral conversion reactor 1 into a plurality of heating zones from the first end 104 to the second end 105. The inert gas input pipe 7 is connected to the discharge pipe 3.

Preferably, the housing 100 comprises an outer casing 101 and an inner liner 102 detachably connected to an inner side the outer casing 101. The blade element 40 is extended between the first ends 104 and the second ends 105 of the housing 100 inside the reaction chamber 103.

The heating device 6 employs high temperature gas heating method for heating and comprises a gas inlet 63 and a gas outlet 64. The gas inlet 63 is positioned in the middle of the heating device 6 and the gas outlet 64 is positioned at the two ends of the heat-resistant spiral conversion reactor 1 and a bottom end of the feeding pipe 2.

The device for producing black phosphorus for industrialized continuous production further comprises a raw materials conveying pipe 8 connected to the feeding pipe 2; a feeding port 13 connected to the raw materials conveying pipe 8 arranged for feeding raw materials from the feeding port 13; a product conveying pipe 10 connected to a bottom portion of the discharge pipe 3; a product discharge port 11 provided on the product conveying pipe 10; and a product packaging system 12 connected to the product conveying pipe 10 through the product discharge port 11.

The outer casing 101 is made of carbon steel and the inner liner 102 is made of high temperature resistant glass.

According to the present invention, a method of producing black phosphorus by using the device for producing black phosphorus for industrialized continuous production comprises the steps of:

(I) Preparing raw materials: the reaction raw materials are red phosphorus, tin and iodine, and the reaction raw materials are weighed to obtain according to the ratio of red phosphorus:tin:iodine=40:3:0.7;

(II) Filling the raw materials: the raw materials are mixed uniformly and transported to the feeding pipe 2 through the raw materials conveying pipe 8;

(III) Carrying out calcination reaction: introducing inert gas to the heat-resistant spiral conversion reactor 1 through the inert gas input pipe 7 to remove air inside the heat-resistant spiral conversion reactor 1; dividing the heat-resistant spiral conversion reactor 1 into four zones, namely, A: a first zone of medium temperature, B: a high temperature zone, C: a second zone of medium temperature, and D: a low temperature zone, preheating the heat-resistant spiral conversion reactor 1 by the heating device 6 such that a temperature of the four zones is controlled sequentially to 550° C., 700° C., 500° C., 350° C. respectively; heating the raw material in the feeding pipe 2 for carrying out reaction and then feeding the raw materials after reaction into the heat-resistant spiral conversion reactor 1 such that the raw materials are guided to move through the four zones in sequence towards the discharge pipe 3 under driving force of the propeller blade unit 4 and to carry out reaction in the four zones, wherein a residence time of the raw material is controlled to 5 hours by the motor 5, through which a rotation speed of the blade element 40 is controlled; and a final product is prepared after the reaction in the four zones is completed, then the final product is discharged through the discharge pipe 3 and is transported to the product packaging system 12 through the product conveying pipe 10 for packaging into an end product.

The heating device 6 employs high-temperature gas for heating the heat-resistant spiral conversion reactor 1. The high-temperature gas enters from the middle of the reactor so that the temperature in the middle is the highest. When the gas is diffused to two ends, the temperature at two ends is gradually reduced due to the heat consumption by the reaction such that a continuous temperature change zone with high temperature in the middle and low temperature at two ends. The temperature and heating time inside the reactor 1 can be flexibly adjusted through controlling the temperature and quantity of the high temperature gas. The final products obtained after the reaction are directly sent to the product packaging system 12 for packaging to avoid oxidation of the final product. In a continuous production, auxiliary materials tin and iodine can be replenished at a quantity of reducing by halve and at a quantity of one quarter respectively for every 10 days.

The black phosphorus conversion rate produced by the method in this embodiment is 93%.

Embodiment 3

Referring to FIG. 2 of the drawings, the device for producing black phosphorus for industrialized continuous production according to this preferred embodiment of the present invention comprises: a heat-resistant spiral conversion reactor 1; a feeding pipe 2; a discharge pipe 3; a propeller blade unit 4; a motor 5; a heating device 6 and an inert gas input pipe 7.

The heat-resistant spiral conversion reactor 1 comprises a housing 100 and a reaction chamber 103 therein. The housing 100 is elongated in structure defining two opposite ends, namely a first end 104 and a second end 105. The feeding pipe 2 is connected to the first end 104 of the housing 100 so that raw materials is capable being fed into the reaction chamber 103 at the first end 104 through the feeding pipe 2. The discharge pipe 3 is connected to the second end 105 of the housing 100 at a bottom position. The propeller blade unit 4 comprises a rotating shaft 41, a blade element 40 mounted on the rotating shaft 41 and two bushing elements 42 connecting two ends of the rotating shaft 41 to the first ends 104 and the second ends 105 of the housing 100. The motor 5 is connected to the rotating shaft 41 at one end of the rotating shaft 41 for driving a rotational movement of the rotating shaft 41 so that the blade element 40 is driven to rotate. The heating device 6 encloses the housing 100 of the heat-resistant spiral conversion reactor 1 and the feeding pipe 2 at an outer side, and defines the heat-resistant spiral conversion reactor 1 into a plurality of heating zones from the first end 104 to the second end 105. The inert gas input pipe 7 is connected to the discharge pipe 3.

The heating device 6 comprises a plurality segments of resistance wire 61 and a heating control 62 electrically connected to the plurality segments of resistance wire 61 for controlling a heating temperature of the plurality segments of resistance wire 61.

The device for producing black phosphorus for industrialized continuous production further comprises a raw materials conveying pipe 8 and a fluid materials input pipe 9 connected to the feeding pipe 2; a feeding port 13 connected to the raw materials conveying pipe 8 arranged for feeding raw materials from the feeding port 13; a product conveying pipe 10 connected to the discharge pipe 3; a product discharge port 11 provided on the product conveying pipe 10; and a product packaging system 12 connected to the product conveying pipe 10 through the product discharge port 11.

The raw materials conveying pipe 8 and the product conveying pipe 10 employ spiral conveying movement for conveyance.

The housing 100 is made of manganese.

According to the present invention, a method of producing black phosphorus by using the device for producing black phosphorus for industrialized continuous production comprises the steps of:

(I) Preparing raw materials: the reaction raw materials are yellow phosphorus, tin and iodine, and the reaction raw materials are weighed to obtain according to the ratio of yellow phosphorus:tin:iodine=30:2:0.4;

(II) Filling the raw materials: the raw materials tin and iodine are mixed uniformly and transported to the feeding pipe 2 through the raw materials conveying pipe 8 while yellow phosphorus is added to the feeding pipe 2 by the fluid material input pipe 9;

(III) Carrying out calcination reaction: introducing inert gas to the heat-resistant spiral conversion reactor 1 through the inert gas input pipe 7 to remove air inside the heat-resistant spiral conversion reactor 1; dividing the heat-resistant spiral conversion reactor 1 into four zones, namely, A: a first zone of medium temperature, B: a high temperature zone, C: a second zone of medium temperature, and D: a low temperature zone, preheating the heat-resistant spiral conversion reactor 1 by the heating device 6 such that a temperature of the four zones is controlled sequentially to 500° C., 650° C., 400° C., 300° C. respectively; heating the raw materials yellow phosphorus, tin and iodine in the feeding pipe 2 and then feeding the raw materials into the heat-resistant spiral conversion reactor 1 such that the raw materials are guided to move through the four zones in sequence towards the discharge pipe 3 under driving force of the propeller blade unit 4 and to carry out reaction in the four zones, wherein a residence time of the raw material is controlled to 2 hours by the motor 5, through which a rotation speed of the blade element 40 is controlled; and a final product is prepared after the reaction in the four zones is completed, then the final product is discharged through the discharge pipe 3 and is transported to the product packaging system 12 through the product conveying pipe 10 for packaging into an end product.

The industrially produced yellow phosphorus is mostly in liquid state. The yellow phosphorus storage tank is connected to the fluid material input pipe 9 and is added to the feeding pipe 2 through the fluid material input pipe 9 while tin and iodine are added to the feeding pipe 2 through the raw material conveying pipe 8. The heating device 6 is capable of flexibly adjusting the temperature and heating time inside the reactor 1. The final products obtained after the reaction are directly sent to the product packaging system 12 for packaging to avoid oxidation of the final product. In a continuous production, auxiliary materials tin and iodine can be replenished at a quantity of reducing by three-quarters and by halve respectively for every 7 days.

The black phosphorus conversion rate produced by the method in this embodiment is 90%. In the absence of inner liner, due to poor heating and insulation, lower conversion rate is resulted compared to device with inner liner.

Embodiment 4

Referring to FIG. 2 of the drawings, the device for producing black phosphorus for industrialized continuous production according to this preferred embodiment of the present invention comprises: a heat-resistant spiral conversion reactor 1; a feeding pipe 2; a discharge pipe 3; a propeller blade unit 4; a motor 5; a heating device 6 and an inert gas input pipe 7.

The heat-resistant spiral conversion reactor 1 comprises a housing 100 and a reaction chamber 103 therein. The housing 100 is elongated in structure defining two opposite ends, namely a first end 104 and a second end 105. The feeding pipe 2 is connected to the first end 104 of the housing 100 so that raw materials is capable being fed into the reaction chamber 103 at the first end 104 through the feeding pipe 2. The discharge pipe 3 is connected to the second end 105 of the housing 100 at a bottom position. The propeller blade unit 4 comprises a rotating shaft 41, a blade element 40 mounted on the rotating shaft 41 and two bushing elements 42 connecting two ends of the rotating shaft 41 to the first ends 104 and the second ends 105 of the housing 100. The motor 5 is connected to the rotating shaft 41 at one end of the rotating shaft 41 for driving a rotational movement of the rotating shaft 41 so that the blade element 40 is driven to rotate. The heating device 6 encloses the housing 100 at an outer side and defines the heat-resistant spiral conversion reactor 1 into a plurality of heating zones from the first end 104 to the second end 105. The inert gas input pipe 7 is connected to the discharge pipe 3.

Preferably, the housing 100 comprises an outer casing 101 and an inner liner 102 detachably connected to an inner side the outer casing 101. The blade element 40 is extended between the first ends 104 and the second ends 105 of the housing 100 inside the reaction chamber 103.

The heating device 6 comprises a plurality segments of resistance wire 61 and a heating control 62 electrically connected to the plurality segments of resistance wire 61 for controlling a heating temperature of the plurality segments of resistance wire 61.

The device for producing black phosphorus for industrialized continuous production further comprises a raw materials conveying pipe 8 and a fluid materials input pipe 9 connected to the feeding pipe 2; a feeding port 13 connected to the raw materials conveying pipe 8 arranged for feeding raw materials from the feeding port 13; a product conveying pipe 10 connected to a bottom of the discharge pipe 3; a product discharge port 11 provided on the product conveying pipe 10; and a product packaging system 12 connected to the product conveying pipe 10 through the product discharge port 11.

The raw materials conveying pipe 8 and the product conveying pipe 10 employ spiral conveying movement for conveyance.

The outer casing 101 is made of metal with carbide coating and the inner liner 102 is made of enamel.

According to the present invention, a method of producing black phosphorus by using the device for producing black phosphorus for industrialized continuous production comprises the steps of:

(I) Preparing raw materials: the reaction raw materials are yellow phosphorus, tin and iodine, and the reaction raw materials are weighed to obtain according to the ratio of yellow phosphorus:tin:iodine=16:1.4:0.6;

(II) Filling the raw materials: the raw materials tin and iodine are mixed uniformly and transported to the feeding pipe 2 through the raw materials conveying pipe 8 while yellow phosphorus is added to the feeding pipe 2 by the fluid material input pipe 9;

(III) Carrying out calcination reaction: introducing inert gas to the heat-resistant spiral conversion reactor 1 through the inert gas input pipe 7 to remove air inside the heat-resistant spiral conversion reactor 1; dividing the heat-resistant spiral conversion reactor 1 into four zones, namely, A: a first zone of medium temperature, B: a high temperature zone, C: a second zone of medium temperature, and D: a low temperature zone, preheating the heat-resistant spiral conversion reactor 1 by the heating device 6 such that a temperature of the four zones is controlled sequentially to 450° C., 600° C., 360° C., 250° C. respectively; heating the raw materials yellow phosphorus, tin and iodine in the feeding pipe 2 and then feeding the raw materials into the heat-resistant spiral conversion reactor 1 such that the raw materials are guided to move through the four zones in sequence towards the discharge pipe 3 under driving force of the propeller blade unit 4 and to carry out reaction in the four zones, wherein a residence time of the raw material is controlled by the motor 5, through which a rotation speed of the blade element 40 is controlled, wherein the residence time of the raw materials in the four zones are controlled to 4 hours, 5 hours, 3.5 hours and 3 hours respectively; and a final product is prepared after the reaction in the four zones is completed, then the final product is discharged through the discharge pipe 3 and is transported to the product packaging system 12 through the product conveying pipe 10 for packaging into an end product.

The industrially produced yellow phosphorus is mostly in liquid state. The yellow phosphorus storage tank is connected to the fluid material input pipe 9 and is added to the feeding pipe 2 through the fluid material input pipe 9 while tin and iodine are added to the feeding pipe 2 through the raw material conveying pipe 8. In the production process, air is separated by the inert gas through the discharge pipe 3 so as to ensure an oxygen-free or low-oxygen environment. The heating device 6 is capable of flexibly adjusting the temperature and heating time inside the reactor. The final products obtained after the reaction are directly sent to the product packaging system 12 for packaging to avoid oxidation of the final product. In a continuous production, auxiliary materials tin and iodine can be replenished at a quantity of reducing by three-quarters and by halve respectively for every 7 days.

The black phosphorus conversion rate produced by the method in this embodiment is 98.5%.

Embodiment 5

Referring to FIG. 3 and FIG. 4 of the drawings, the device for producing black phosphorus for industrialized continuous production according to this preferred embodiment of the present invention comprises: a heat-resistant spiral conversion reactor 1; a feeding pipe 2; a discharge pipe 3; a propeller blade unit 4; a motor 5; a heating device 6 and an inert gas input pipe 7.

The heat-resistant spiral conversion reactor 1 comprises a housing 100 and a reaction chamber 103 therein. The housing 100 is elongated in structure defining two opposite ends, namely a first end 104 and a second end 105. The feeding pipe 2 is connected to the first end 104 of the housing 100 so that raw materials is capable being fed into the reaction chamber 103 at the first end 104 through the feeding pipe 2. The discharge pipe 3 is connected to the second end 105 of the housing 100 at a bottom position. The propeller blade unit 4 comprises a rotating shaft 41, a blade element 40 mounted on the rotating shaft 41 and two bushing elements 42 connecting two ends of the rotating shaft 41 to the first ends 104 and the second ends 105 of the housing 100. The motor 5 is connected to the rotating shaft 41 at one end of the rotating shaft 41 for driving a rotational movement of the rotating shaft 41 so that the blade element 40 is driven to rotate. The heating device 6 encloses the housing 100 and the feeding pipe 2 at an outer side and defines the heat-resistant spiral conversion reactor 1 into a plurality of heating zones from the first end 104 to the second end 105. The inert gas input pipe 7 is connected to the discharge pipe 3.

Preferably, the housing 100 comprises an outer casing 101 and an inner liner 102 detachably connected to an inner side the outer casing 101. The blade element 40 is extended between the first ends 104 and the second ends 105 of the housing 100 inside the reaction chamber 103.

The heating device 6 employs high temperature gas heating method for heating and comprises a gas inlet 63 and a gas outlet 64. The gas inlet 63 is positioned in the middle of the heating device 6 and the gas outlet 64 is positioned at the two ends of the heat-resistant spiral conversion reactor 1 and a bottom end of the feeding pipe 2.

The device for producing black phosphorus for industrialized continuous production further comprises a raw materials conveying pipe 8 connected to the feeding pipe 2; a feeding port 13 connected to the raw materials conveying pipe 8 arranged for feeding raw materials from the feeding port 13; a product conveying pipe 10 connected to a bottom of the discharge pipe 3; a product discharge port 11 provided on the product conveying pipe 10; and a product packaging system 12 connected to the product conveying pipe 10 through the product discharge port 11.

The raw materials conveying pipe 8 or the product conveying pipe 10 employ spiral conveying movement for conveyance.

According to the present invention, a method of producing black phosphorus by using the device for producing black phosphorus for industrialized continuous production comprises the steps of:

(I) Preparing raw materials: the reaction raw materials are red phosphorus, tin and iodine, and the reaction raw materials are weighed to obtain according to the ratio of red phosphorus:tin:iodine=24:0.9:0.3;

(II) Filling the raw materials: the raw materials are mixed uniformly and transported to the feeding pipe 2 through the raw materials conveying pipe 8;

(III) Carrying out calcination reaction: introducing inert gas to the heat-resistant spiral conversion reactor 1 through the inert gas input pipe 7 to remove air inside the heat-resistant spiral conversion reactor 1; dividing the heat-resistant spiral conversion reactor 1 into four zones, namely, A: a first zone of medium temperature, B: a high temperature zone, C: a second zone of medium temperature, and D: a low temperature zone, preheating the heat-resistant spiral conversion reactor 1 by the heating device 6 such that a temperature of the four zones is controlled sequentially to 420° C., 550° C., 440° C., 290° C. respectively; heating the raw material in the feeding pipe 2 for carrying out reaction and then feeding the raw materials after reaction into the heat-resistant spiral conversion reactor 1 such that the raw materials are guided to move through the four zones in sequence towards the discharge pipe 3 under driving force of the propeller blade unit 4 and to carry out reaction in the four zones, wherein a residence time of the raw material is controlled by the motor 5, through which a rotation speed of the blade element 40 is controlled, wherein the residence time of the raw materials in the four zones are controlled to 5 hours, 4 hours, 5 hours and 1 hours respectively; and a final product is prepared after the reaction in the four zones is completed, then the final product is discharged through the discharge pipe 3 and is transported to the product packaging system 12 through the product conveying pipe 10 for packaging into an end product.

The heating device 6 employs high-temperature gas for heating the heat-resistant spiral conversion reactor 1. The high-temperature gas enters from the center of the reactor so that the temperature in the middle is the highest. When the gas is diffused to two ends, the temperature at two ends is gradually reduced due to the heat consumption by the reaction such that a continuous temperature change zone with high temperature in the middle and low temperature at two ends. The temperature and heating time inside the reactor 1 can be flexibly adjusted through controlling the temperature and quantity of the high temperature gas. The final products obtained after the reaction are directly sent to the product packaging system 12 for packaging to avoid oxidation of the final product. In a continuous production, auxiliary materials tin and iodine can be replenished at a quantity of reducing by three-quarters and by halve respectively for every 5 days.

The black phosphorus conversion rate produced by the method in this embodiment is 95.7%.

The working principle of the present invention: after the raw materials (such as red phosphorus/yellow phosphorus, tin, iodine) enter the feeding pipe 2, they are in the medium temperature zone A of the reaction system of which the temperature is 400-550° C. In this zone, the iodine is sublimated and the tin changes to liquid state, and the gaseous iodine and the liquid tin react to form a tin iodide catalyst; the tin iodide and red phosphorus (or liquid yellow phosphorus) absorb heat energy and undergo gasification to form a gas mixture. The gas mixture enters into the heat-resistant spiral conversion reactor and enters into the high temperature zone B of the reaction system with a temperature of 500-700° C. In this zone, the molecular structure of the phosphorus vapor is further changed under the action of tin iodide. The material in the high temperature zone B proceeds to the second medium temperature zone C with a temperature of 300-500° C. In this zone, the phosphorus vapor whose molecular structure is changed under the action of the tin iodide catalyst is converted to form a black phosphorus solid; the black phosphorus solid enters the subsequent low temperature zone D with a temperature of 230-350° C. under the action of the propeller blade unit, and the black phosphorus is shaped in this zone to obtain the final product.

Figure 10:
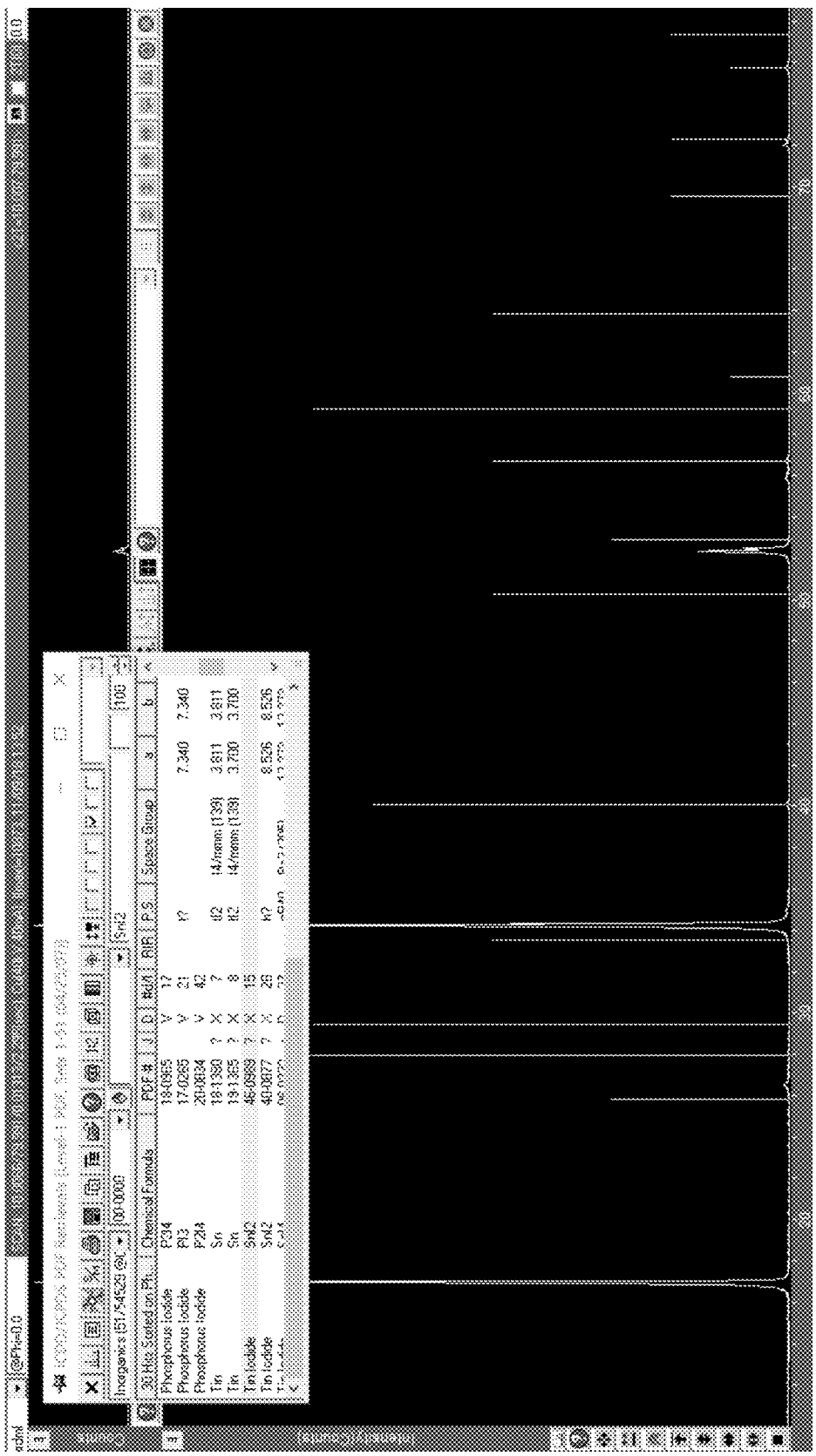
FIG. 10 is an XRD spectrum of the black phosphorus prepared by Embodiment 1 of the present invention.
Figure 11:
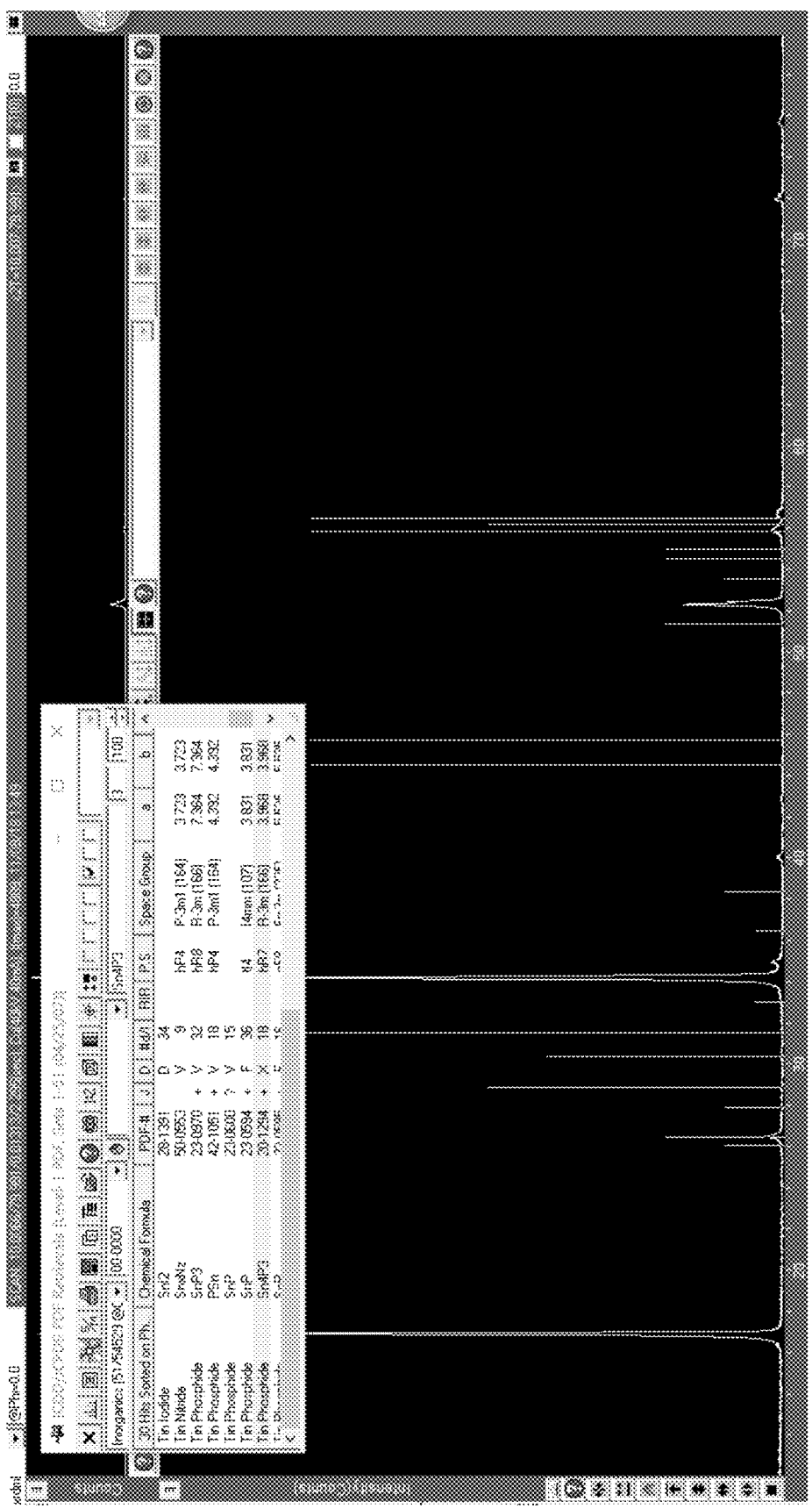
FIG. 11 is an XRD spectrum of the black phosphorus prepared by Embodiment 2 of the present invention.
Figure 12:
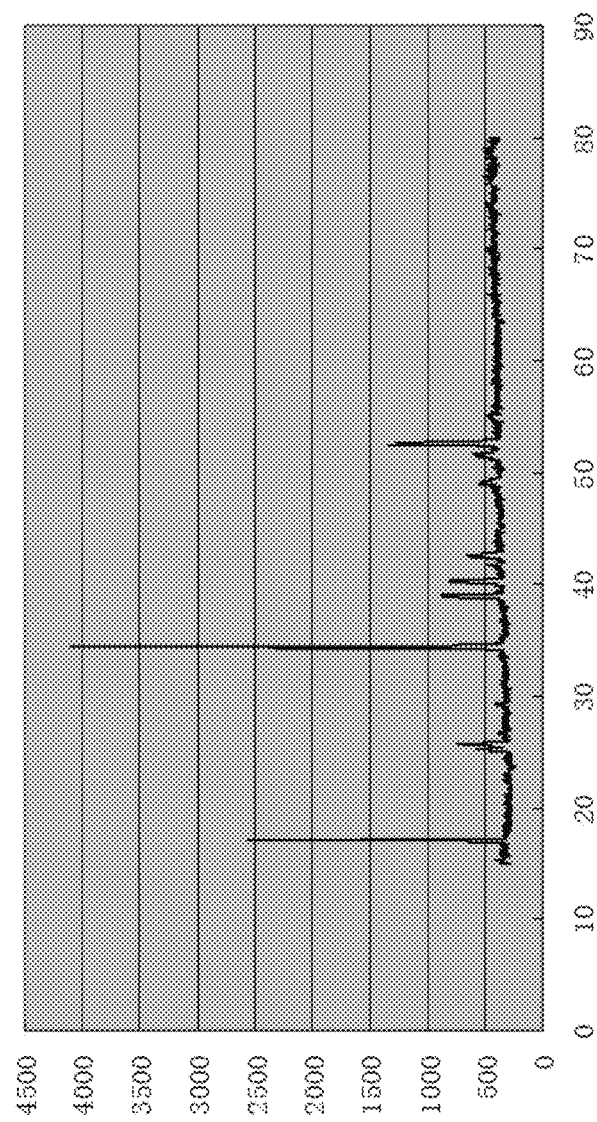
FIG. 12 is an XRD spectrum of the black phosphorus prepared by Embodiment 3 of the present invention.

The black phosphorus products produced by the device and method of the present invention are shown in FIGS. 5 to 8. FIGS. 10 to 12 are an XDR spectrum of the black phosphorus prepared by the present invention. As seen from the FIGS. 5-8 and 10-12, the product produced is high quality black phosphorus, which is a large piece of crystal with a shiny metallic luster.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of producing black phosphorus for industrialized continuous production by using a device for producing black phosphorus for industrialized continuous production which comprises: a heat-resistant spiral conversion reactor; a feeding pipe; a discharge pipe; a propeller blade; a motor; and a heating device and an inert gas input, wherein said heat-resistant spiral conversion reactor comprises a housing and a reaction chamber therein, said housing is elongated in structure defining two opposite ends, namely a first end and a second end, said feeding pipe is connected to said first end of said housing so that raw materials is capable being fed into said reaction chamber at said first end through said feeding pipe, said discharge pipe is connected to said second end of said housing at a bottom portion thereof, said propeller blade unit comprises a rotating shaft, a blade element mounted on said rotating shaft and two bushing elements connecting two ends of said rotating shaft to said first end and said second end of said housing, said motor is connected to said rotating shaft at one end of said rotating shaft for driving a rotational movement of said rotating shaft so that said blade element is driven to rotate, said heating device encloses said housing at an outer side and defines said heat-resistant spiral conversion reactor into a plurality of heating zones from said first end to said second end, and said inert gas input pipe is connected to said discharge pipe;

said device further comprising a raw materials conveying pipe, a fluid materials input connected to said feeding pipe, a feeding port provided on said raw materials conveying pipe, a product conveying pipe provided at a bottom portion of said discharge pipe, a product discharge port provided on said product conveying pipe, and a product packaging system connected to said product conveying pipe through said product discharge port, wherein said raw materials conveying pipe and said product conveying pipe employ a spiral conveying movement mechanism for conveyance so that said feeding materials and discharge materials are uniformly mixed by said spiral conveying movement mechanism while an amount of input and output materials are controlled through said spiral conveying movement mechanism, said method comprising the steps of:

(a) weighing raw materials of red phosphorus, tin and iodine according to a weight ratio of red phosphorus:tin:iodine=6-40:0.7-3:0.2-0.7;

(b) mixing said raw materials uniformly, feeding said raw materials through said feeding port and transporting said raw materials to said feeding pipe through said raw materials conveying pipe;

(c) introducing inert gas to said heat-resistant spiral conversion reactor through said inert gas input pipe to remove air therein;

(d) carrying out calcination reaction inside said heat-resistant spiral conversion reactor by heating said raw materials in said feeding pipe and then heating said raw materials while said raw materials is guided to flow through said plurality of heating zones sequentially from said first end to said second end towards said discharge pipe under driving force of said propeller blade unit to form a final product, wherein said heat-resistant spiral conversion reactor is divided into four heating zones in order, namely, a first zone of medium temperature, a high temperature zone, a second zone of medium temperature and a low temperature zone, and a temperature of said four heating zones is controlled to 400-550° C., 550-700° C., 300-500° C. and 230-350° C. respectively so that said raw materials are carrying out reactions under different temperature conditions, wherein a residence time of said raw material inside said heat-resistant spiral conversion reactor is controlled to 2-20 h by controlling a rotation speed of said propeller blade unit through said motor, and (e) discharging said final product through said discharge pipe and transporting said final product to said product packaging system directly through said product conveying pipe.

2. A method of producing black phosphorus for industrialized continuous production by using a device for producing black phosphorus for industrialized continuous production which comprises: a heat-resistant spiral conversion reactor; a feeding pipe; a discharge pipe; a propeller blade; a motor; and a heating device and an inert gas input, wherein said heat-resistant spiral conversion reactor comprises a housing and a reaction chamber therein, said housing is elongated in structure defining two opposite ends, namely a first end and a second end, said feeding pipe is connected to said first end of said housing so that raw materials is capable being fed into said reaction chamber at said first end through said feeding pipe, said discharge pipe is connected to said second end of said housing at a bottom portion thereof, said propeller blade unit comprises a rotating shaft, a blade element mounted on said rotating shaft and two bushing elements connecting two ends of said rotating shaft to said first end and said second end of said housing, said motor is connected to said rotating shaft at one end of said rotating shaft for driving a rotational movement of said rotating shaft so that said blade element is driven to rotate, said heating device encloses said housing at an outer side and defines said heat-resistant spiral conversion reactor into a plurality of heating zones from said first end to said second end, and said inert gas input pipe is connected to said discharge pipe, wherein said housing comprises an outer casing and an inner liner detachably connected to an inner side said outer casing, and said heating device comprises a plurality segments of resistance wire and a heating control electrically connected to said plurality segments of resistance wire, said device further comprising a raw materials conveying pipe, a fluid materials input connected to said feeding pipe, a feeding port provided on said raw materials conveying pipe, a product conveying pipe provided at a bottom portion of said discharge pipe, a product discharge port provided on said product conveying pipe, and a product packaging system connected to said product conveying pipe through said product discharge port, wherein said raw materials conveying pipe and said product conveying pipe employ a spiral conveying movement mechanism for conveyance so that said feeding materials and discharge materials are uniformly mixed by said spiral conveying movement mechanism while an amount of input and output materials are controlled through said spiral conveying movement mechanism, said method comprising the steps of:

(a) weighing raw materials of red phosphorus, tin and iodine according to a weight ratio of red phosphorus:tin:iodine=6-40:0.7-3:0.2-0.7;

(b) mixing said raw materials uniformly, feeding said raw materials through said feeding port and transporting said raw materials to said feeding pipe through said raw materials conveying pipe;

(c) introducing inert gas to said heat-resistant spiral conversion reactor through said inert gas input pipe to remove air therein;

(d) carrying out calcination reaction inside said heat-resistant spiral conversion reactor by heating said raw materials in said feeding pipe and then heating said raw materials while said raw materials is guided to flow through said plurality of heating zones sequentially from said first end to said second end towards said discharge pipe under driving force of said propeller blade unit to form a final product, wherein said heat-resistant spiral conversion reactor is divided into four heating zones in order, namely, a first zone of medium temperature, a high temperature zone, a second zone of medium temperature and a low temperature zone, and a temperature of said four heating zones is controlled to 400-550° C., 550-700° C., 300-500° C. and 230-350° C. respectively so that said raw materials are carrying out reactions under different temperature conditions, wherein a residence time of said raw material inside said heat-resistant spiral conversion reactor is controlled to 2-20 h by controlling a rotation speed of said propeller blade unit through said motor, and (e) discharging said final product through said discharge pipe and transporting said final product to said product packaging system directly through said product conveying pipe.

3. A method of producing black phosphorus for industrialized continuous production by using a device for producing black phosphorus for industrialized continuous production, which comprises: a heat-resistant spiral conversion reactor; a feeding pipe; a discharge pipe; a propeller blade; a motor; and a heating device and an inert gas input, wherein said heat-resistant spiral conversion reactor comprises a housing and a reaction chamber therein, said housing is elongated in structure defining two opposite ends, namely a first end and a second end, said feeding pipe is connected to said first end of said housing so that raw materials is capable being fed into said reaction chamber at said first end through said feeding pipe, said discharge pipe is connected to said second end of said housing at a bottom portion thereof, said propeller blade unit comprises a rotating shaft, a blade element mounted on said rotating shaft and two bushing elements connecting two ends of said rotating shaft to said first end and said second end of said housing, said motor is connected to said rotating shaft at one end of said rotating shaft for driving a rotational movement of said rotating shaft so that said blade element is driven to rotate, said heating device encloses said housing at an outer side and defines said heat-resistant spiral conversion reactor into a plurality of heating zones from said first end to said second end, and said inert gas input pipe is connected to said discharge pipe, wherein said housing comprises an outer casing and an inner liner detachably connected to an inner side said outer casing, said device further comprises a raw materials conveying pipe, a fluid materials input connected to said feeding pipe, a feeding port provided on said raw materials conveying pipe, a product conveying pipe provided at a bottom portion of said discharge pipe, a product discharge port provided on said product conveying pipe, and a product packaging system connected to said product conveying pipe through said product discharge port, wherein said raw materials conveying pipe and said product conveying pipe employ a spiral conveying movement mechanism for conveyance so that said feeding materials and discharge materials are uniformly mixed by said spiral conveying movement mechanism while an amount of input and output materials are controlled through said spiral conveying movement mechanism, wherein said heating device employs high temperature gas for heating and comprises a gas inlet and a gas outlet, wherein said gas inlet is positioned in a middle portion of said heating device and said gas outlet is positioned at said two ends of said heat-resistant spiral conversion reactor and a bottom end of said feeding pipe, said method comprising the steps of:

(a) weighing raw materials of red phosphorus, tin and iodine according to a weight ratio of red phosphorus:tin:iodine=6-40:0.7-3:0.2-0.7;

(b) mixing said raw materials uniformly, feeding said raw materials through said feeding port and transporting said raw materials to said feeding pipe through said raw materials conveying pipe;

(c) introducing inert gas to said heat-resistant spiral conversion reactor through said inert gas input pipe to remove air therein;

(d) carrying out calcination reaction inside said heat-resistant spiral conversion reactor by heating said raw materials in said feeding pipe and then heating said raw materials while said raw materials is guided to flow through said plurality of heating zones sequentially from said first end to said second end towards said discharge pipe under driving force of said propeller blade unit to form a final product, wherein said heat-resistant spiral conversion reactor is divided into four heating zones in order, namely, a first zone of medium temperature, a high temperature zone, a second zone of medium temperature and a low temperature zone, and a temperature of said four heating zones is controlled to 400-550° C., 550-700° C., 300-500° C. and 230-350° C. respectively so that said raw materials are carrying out reactions under different temperature conditions, wherein a residence time of said raw material inside said heat-resistant spiral conversion reactor is controlled to 2-20 h by controlling a rotation speed of said propeller blade unit through said motor, and (e) discharging said final product through said discharge pipe and transporting said final product to said product packaging system directly through said product conveying pipe.

4. The method of producing black phosphorus for industrialized continuous production according to claim 3, wherein a ratio of red phosphorus:tin:iodine=16-24:0.9-1.4:0.3-0.6; and a residence time of said raw materials in said four heating zones are controlled to 1-4 hours, 3-15 hours, 1-3 hours and 1-3 hours respectively.

5. A method of producing black phosphorus for industrialized continuous production by using the device for producing black phosphorus for industrialized continuous production according to claim 1, wherein in the step (b), said raw materials tin and iodine are mixed uniformly, fed through said feeding port and transported to said feeding pipe through said raw materials conveying pipe while said yellow phosphorus is added to said feeding pipe through said fluid material input pipe.

6. The method of producing black phosphorus for industrialized continuous production according to claim 5, a ratio of yellow phosphorus:tin:iodine=16-24:0.9-1.4:0.3-0.6; and a residence time of said raw materials in said four heating zones are controlled to 1-4 hours, 3-15 hours, 1-3 hours and 1-3 hours respectively.

* * * * *